United States Patent
Fujiwara et al.

(10) Patent No.: US 10,531,682 B2
(45) Date of Patent: Jan. 14, 2020

(54) FROZEN LIQUID EGG WHITES, METHOD FOR PRODUCING SAME, AND LIQUID EGG WHITES RESULTING FROM DEFROSTING FROZEN LIQUID EGG WHITES

(71) Applicant: Kewpie Corporation, Tokyo (JP)

(72) Inventors: Naoki Fujiwara, Tokyo (JP); Noriaki Nishijima, Tokyo (JP); Ryou Sasahara, Tokyo (JP); Hideaki Kobayashi, Tokyo (JP); Asao Ito, Tokyo (JP)

(73) Assignee: KEWPIE CORPORATION, Tokyo (JP)

( * ) Notice: Subject to any disclaimer, the term of this patent is extended or adjusted under 35 U.S.C. 154(b) by 421 days.

(21) Appl. No.: 15/320,188

(22) PCT Filed: May 29, 2015

(86) PCT No.: PCT/JP2015/065553
§ 371 (c)(1),
(2) Date: Dec. 19, 2016

(87) PCT Pub. No.: WO2015/194346
PCT Pub. Date: Dec. 23, 2015

(65) Prior Publication Data
US 2017/0119030 A1    May 4, 2017

(30) Foreign Application Priority Data
Jun. 17, 2014  (WO) .................. PCT/JP2014/003259

(51) Int. Cl.
A23L 15/00   (2016.01)
A23B 5/04    (2006.01)

(52) U.S. Cl.
CPC ................ *A23L 15/00* (2016.08); *A23B 5/04* (2013.01); *A23V 2002/00* (2013.01)

(58) Field of Classification Search
None
See application file for complete search history.

(56) References Cited

U.S. PATENT DOCUMENTS

| | | | |
|---|---|---|---|
| 3,917,873 A | 11/1975 | Kuroda et al. | |
| 2004/0208965 A1 | 10/2004 | Ueno et al. | |

FOREIGN PATENT DOCUMENTS

| | | | | |
|---|---|---|---|---|
| JP | S5137328 B2 | 3/1976 | | |
| JP | H09313100 A | 12/1997 | | |
| JP | 3072640 B2 * | 7/2000 | ............. | A23L 15/00 |
| JP | 3072640 B2 | 7/2000 | | |
| JP | 2003334033 A | 11/2003 | | |
| JP | 2004222529 A | 8/2004 | | |
| JP | 2010200662 A | 9/2010 | | |
| JP | 2011072215 A | 4/2011 | | |
| JP | 2012-196174 A * | 10/2012 | ............... | A23L 1/31 |
| JP | 2013042723 A | 3/2013 | | |
| JP | 5739077 B1 | 6/2015 | | |

OTHER PUBLICATIONS

English Translation of JP2012-196174A, pp. 1-13. (Year: 2012).*
English Translation of JP3072640B2, pp. 1-12. (Year: 2000).*
International Search Report in International Application No. PCT/JP2015/065553, filed May 29, 2015.

* cited by examiner

*Primary Examiner* — Nikki H. Dees
*Assistant Examiner* — Amber M Cox
(74) *Attorney, Agent, or Firm* — Saliwanchik, Lloyd & Eisenschenk

(57) ABSTRACT

The present invention relates to frozen liquid egg whites in which are admixed 0.01-0.4 parts of egg yolks for every 100 parts of egg whites, wherein 0.1-2 parts inclusive of α-cyclodextrin are added for every 100 parts of liquid egg whites, and the turbidity H1 (degrees) calculated by means of the belowmentioned formula (1) is 18 or more: $H1=H2-H3$ ... (1). Here, H2 indicates the turbidity (degrees) of the frozen liquid egg whites measured immediately after being defrosted, and H3 indicates the egg-derived turbidity y (degrees) calculated by means of the belowmentioned approximation formula (2): $y=-380.75x^2+272.42x+17.257$ ... (2). Here, x indicates the admixed amount (parts) of egg yolks for every 100 parts of liquid egg whites.

2 Claims, 1 Drawing Sheet

FROZEN LIQUID EGG WHITES, METHOD FOR PRODUCING SAME, AND LIQUID EGG WHITES RESULTING FROM DEFROSTING FROZEN LIQUID EGG WHITES

CROSS-REFERENCE TO RELATED APPLICATION

This application is the U.S. national stage application of International Patent Application No. PCT/JP2015/065553, filed May 29, 2015, which claims priority to International Patent Application No. PCT/JP2014/003259, filed Jun. 17, 2014, the disclosures of each of which are incorporated herein by reference in their entirety.

TECHNICAL FIELD

The present invention relates to frozen liquid egg whites having a high foaming property after being defrosted, a method for producing the same, and liquid egg whites resulting from defrosting frozen liquid egg whites.

BACKGROUND ART

In the past, various kinds of foods such as confectionaries or breads are produced using egg whites having a certain foaming property. The foaming property of egg whites largely affects the leavening degree, smoothness, texture, and the like of such foods, the foaming property being indicated by stiffness and other properties of foam.

There are known various kinds of factors that decrease the foaming property of egg whites. A main factor is egg yolks admixed in egg whites, for example. Egg yolks may be admixed in egg whites unavoidably when mechanically breaking shell eggs on the industrial scale and separating egg yolks from egg whites.

Further, it is known that the foaming power of egg whites is further decreased after egg whites are frozen, the egg whites being obtained by mechanically breaking shell eggs and egg yolks being admixed (see Non-Patent Literature 1).

Meanwhile, in the field of frozen foods, it is generally known that, when freezing foods where the transit time of the temperature zone from −1° C. to −5° C., i.e., a so-called the maximum ice crystal generation temperature zone, is long, large ice crystals are formed and therefore tissues of foods are highly likely to be broken. In view of this, so-called rapid freezing, in which the transit time of the temperature zone from −1° C. to −5° C. is short, is recommended when freezing foods to produce frozen foods.

Similarly, when producing frozen liquid egg whites, it is understood that the freezing condition, in which the transit speed of this temperature zone is high, is preferable in order to minimize damage of egg whites due to freezing and in order to keep the condition of defrosted frozen liquid egg whites similar to the condition of unfrozen liquid egg whites.

Meanwhile, for example, Patent Literature 1 discloses a method for adding and mixing β-cyclodextrin in an example in order to prevent a foaming property from being decreased due to egg yolks. It is known that this method has some, but inadequate, improvements in a foaming power (see result of Comparative Example 4 of the present description).

CITATION LIST

Patent Literature

Patent Literature 1: Japanese Patent No. 3072640

Non-Patent Literature

Non-Patent Literature 1: Yusuke ASANO and Ryozo ISHIHARA, "Egg—the chemistry and processing technology-", Kohrin Techno-Books, issued on 10 Dec. 1985, p. 142 and p. 143

DISCLOSURE OF INVENTION

Technical Problem

In recent years, consumer needs for confectionaries and breads that use egg whites having an adequate foaming property are increasing more and more. In order to meet the needs, frozen liquid egg whites are widely used in the field of confectionary-production and bread-production, frozen liquid egg whites being mass-produced by industrially breaking eggs, having a high preserving property, and being convenient. However, egg yolks are admixed inevitably when industrially breaking eggs, and a foaming property is decreased due to freezing. Therefore, in the past, it has been difficult to meet consumer needs for confectionaries and other foods having better texture with the use of frozen liquid egg whites.

In view of the abovementioned circumstances, it is an object of the present invention to provide frozen liquid egg whites having a high foaming property even if egg yolks are admixed, a method for producing the same, and liquid egg whites resulting from defrosting frozen liquid egg whites.

Solution to Problem

The inventors of the present invention have conducted intensive studies to attain the object. As a result, the inventors have found out liquid egg whites having a foaming property higher than the past even if egg yolks are admixed in frozen liquid egg whites, by purposefully employing the freezing condition, which has been believed to avoid, i.e., the freezing condition where the transit time of the temperature zone from −1° C. to −6° C. is long, and by using a certain amount of α-cyclodextrin, and have thus achieved the present invention.

Therefore, the present invention provides the following.
(1) Frozen liquid egg whites,
0.01 parts or more and 0.4 parts or less of egg yolks being admixed for every 100 parts of liquid egg whites, in which
0.1 parts or more and 2 parts or less of α-cyclodextrin are added for every 100 parts of liquid egg whites, and the turbidity H1 (degrees) calculated by means of the belowmentioned formula (1) is 18 or more $$H1=H2-H3 \quad (1)$$

where
H2 indicates the turbidity (degrees) of the frozen liquid egg whites measured immediately after being defrosted, and
H3 indicates the egg-derived turbidity y (degrees) calculated by means of the belowmentioned approximation formula (2)

$$y=-380.75x^2+272.42x+17.257 \quad (2)$$

where
x indicates the admixed amount (parts) of egg yolks for every 100 parts of liquid egg whites.
(2) The frozen liquid egg whites according to (1), in which the turbidity change rate h (%) calculated by means of the belowmentioned formula (3) is 1700/% or less $$h=(H4/H1)*100 \quad (3)$$

where

H4 indicates the turbidity (degrees) obtained by subtracting the turbidity y (degrees) calculated by means of the approximation formula (2) from the turbidity (degrees) of the frozen liquid egg whites measured after being defrosted and being refrigerated for 5 days.

(3) The frozen liquid egg whites according to (1) or (2), in which the ratio of the added amount (parts) of α-cyclodextrin to the admixed amount (parts) of egg yolks is 1 or more.

(4) Frozen liquid egg whites, produced by adding α-cyclodextrin to raw-material liquid egg whites, 0.01 parts or more and 0.4 parts or less of egg yolks being admixed for every 100 parts of liquid egg whites of the raw-material liquid egg whites, 0.1 parts or more and 2 parts or less of α-cyclodextrin being added for every 100 parts of liquid egg whites, and freezing the liquid egg whites-with-additive including α-cyclodextrin added, transit time of a product-center temperature from −1° C. to −6° C. being 3 hours or more.

(5) Frozen liquid egg whites, produced by adding α-cyclodextrin to raw-material liquid egg whites, 0.01 parts or more and 0.4 parts or less of egg yolks being admixed for every 100 parts of liquid egg whites of the raw-material liquid egg whites, 0.1 parts or more and 2 parts or less of α-cyclodextrin being added for every 100 parts of liquid egg whites, and freezing the liquid egg whites-with-additive including α-cyclodextrin added, transit time of a product-center temperature from −1° C. to −6° C. being 3 hours or more and less than 5 hours.

(6) Liquid egg whites, obtained by defrosting the frozen liquid egg whites according to any one of (1) to (5).

(7) A method for producing frozen liquid egg whites, including:

adding α-cyclodextrin to raw-material liquid egg whites, 0.01 parts or more and 0.4 parts or less of egg yolks being admixed for every 100 parts of liquid egg whites of the raw-material liquid egg whites, 0.1 parts or more and 2 parts or less of α-cyclodextrin being added for every 100 parts of liquid egg whites; and freezing the liquid egg whites-with-additive including α-cyclodextrin added, transit time of a product-center temperature from −1° C. to −6° C. being 3 hours or more.

(8) A method for producing frozen liquid egg whites, including:

adding α-cyclodextrin to raw-material liquid egg whites, 0.01 parts or more and 0.4 parts or less of egg yolks being admixed for every 100 parts of liquid egg whites of the raw-material liquid egg whites, 0.1 parts or more and 2 parts or less of α-cyclodextrin being added for every 100 parts of liquid egg whites; and freezing the liquid egg whites-with-additive including α-cyclodextrin added, transit time of a product-center temperature from −1° C. to −6° C. being 3 hours or more and less than 5 hours.

Advantageous Effects of Invention

According to the present invention, frozen liquid egg whites having a high foaming property even if egg yolks are admixed, a method for producing the same, and liquid egg whites resulting from defrosting frozen liquid egg whites are provided.

MODE(S) FOR CARRYING OUT THE INVENTION

Figure 1:
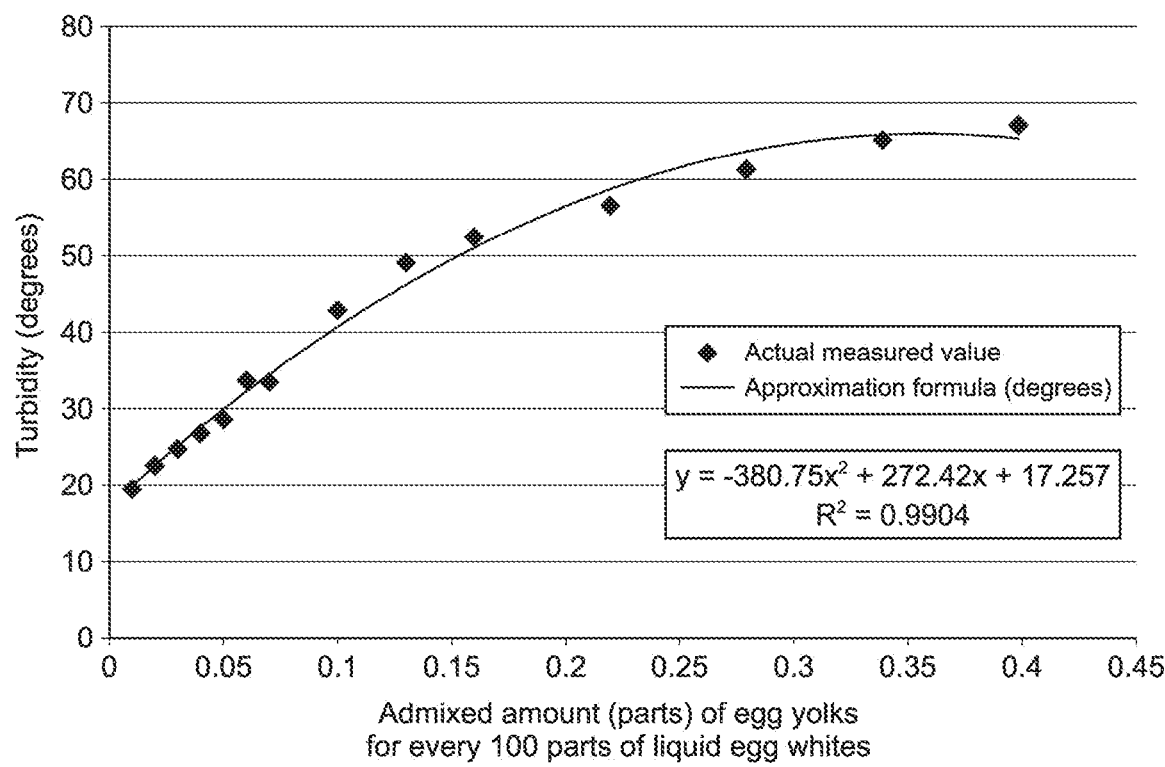
FIG. 1 A graph showing a relation between the admixed amount of egg yolks x (parts) (horizontal axis) for every 100 parts of liquid egg whites and the egg-derived turbidity y (degrees) (vertical axis), the graph being used to derive the approximation formula (2).

Hereinafter, the present invention will be described in detail. Note that, in the present invention, "%" means "mass %" and "parts" mean "mass parts".

<Frozen Liquid Egg Whites>

In the present invention, frozen liquid egg whites mean egg whites obtained by mechanically breaking shell eggs on the industrial scale, separating egg yolks from egg whites, and freezing the thus-obtained raw-material liquid egg whites, which are used for confectionary-production, bread-production, and production of other foods, for example, after being defrosted. The frozen liquid egg whites of the present invention are obtained by adding a predetermined added amount of α-cyclodextrin or the like to raw-material liquid egg whites, in which a predetermined amount of egg yolks are admixed, and freezing the thus-obtained liquid egg whites-with-additive. The frozen liquid egg whites may be filled in a package made of, for example, a paper package, nylon, polyethylene, polypropylene, polyethylene terephthalate, vinyl chloride, a nylon-polyethylene composite sheet, or another material. Frozen liquid egg whites have a high preserving property and are therefore widely used especially for professional use. However, it is known that the foaming property is decreased after freezing raw-material liquid egg whites, in which egg yolks are admixed. (See Patent Literature 1 and Non-Patent Literature 1). The inventors of the present invention have conducted intensive studies regarding frozen liquid egg whites having a high foaming property after being defrosted even if egg yolks are admixed. As a result, as described later, the inventors have reached frozen liquid egg whites having a high foaming property by adding α-cyclodextrin to liquid egg whites, in which egg yolks are admixed, and devising the freezing condition and the like to thereby increase the turbidity.

<Raw-Material Liquid Egg Whites>

Raw-material liquid egg whites, which are raw-materials for frozen liquid egg whites of the present invention, means liquid egg whites obtained by mechanically and industrially breaking eggs such as chicken eggs and separating egg yolks from egg whites. Since eggs are broken mechanically and industrially, a predetermined amount of egg yolks may be admixed in raw-material liquid egg whites of the present invention.

Further, raw-material liquid egg whites of the present invention may be heat-sterilized, the raw-material liquid egg whites may be desugared, lysozyme may be removed from the raw-material liquid egg whites, or the raw-material liquid egg whites may be treated in another way.

<Liquid Egg Whites Resulting from Defrosting Frozen Liquid Egg Whites>

With regard to liquid egg whites resulting from defrosting frozen liquid egg whites of the present invention, the method for defrosting is not limited. For example, a method for defrosting frozen liquid egg whites filled in the abovementioned package in a constant temperature water tank of about 20° C., a method for defrosting frozen liquid egg whites with flowing water such as tap water, a method for defrosting frozen liquid egg whites in a refrigerator, or another method may be employed. Further, a "defrosted" status means the status in which it is determined that the whole frozen liquid egg whites are defrosted to be liquid egg whites by confirming with eyes or by touching the package with a hand.

<Foaming Property>

The foaming property of the present invention means the stiffness of foam, i.e., the amount of load that formed foam may withstand. Note that the other factors that relate to the foaming property include the foaming power (whipping property), which indicates the height of foamed egg whites after foaming egg whites for a predetermined time period, and the stability, which indicates a time period that the formed foam is kept as it is. However, the stiffness of foam affects the leavening degree and the texture of confectionaries and breads largely. Therefore, this description will pay attention to the stiffness of foam.

<Admixed Amount of Egg Yolks in Raw-Material Liquid Egg Whites>

In the present invention, the admixed amount of egg yolks in raw-material liquid egg whites means the admixed amount of egg yolks for every 100 parts of liquid egg whites, and is 0.01 parts or more and 0.4 parts or less, specifically. Liquid egg whites of "100 parts of liquid egg whites" mean liquid egg whites only including raw egg whites without egg yolks admixed. Further, the admixed amount of egg yolks is an amount in terms of raw egg yolks, and the amount of liquid egg whites is an amount in terms of raw egg whites. The admixed amount of egg yolks is the possible amount of egg yolks, which may be admixed when producing raw-material liquid egg whites mechanically and industrially.

Note that, herein, the "admixed amount of egg yolks" means the amount of admixed egg yolks when breaking eggs mechanically and industrially. However, the "admixed amount of egg yolks" also means the amount of admixed egg yolks after controlling the amount of egg yolks by adding egg yolks, by removing egg yolks, or after another treatment.

<α-Cyclodextrin>

The frozen liquid egg whites of the present invention are characterized in that α-cyclodextrin is added. α-cyclodextrin is cyclodextrin polymerized of 6 D-glucose units. Cyclodextrin is a cyclic oligosaccharides made up of D-glucoses bound together in a ring of α-1,4-linkage. In addition to α-dextrin, β-cyclodextrin polymerized of 7 D-glucose units, γ-cyclodextrin polymerized of 8 D-glucose units, and δ- or ε-cyclodextrin polymerized of more D-glucose units are known as cyclodextrin. Further, it is known that, irrespective of the polymerization degree, the molecular structure of cyclodextrin has a cavity and cyclodextrin has an inclusion ability to form an inclusion compound with another compound.

<Added Amount of α-Cyclodextrin>

According to the present invention, the added amount of α-cyclodextrin means the added amount of α-cyclodextrin for every 100 parts of liquid egg whites, and is specifically 0.1 parts or more and preferably 0.2 parts or more. As a result, an adequate foaming property is obtained for frozen liquid egg whites.

Further, the upper limit of the added amount of α-cyclodextrin is not particularly limited, and is preferably 2 parts or less and more preferably 1.5 parts or less for every 100 parts of liquid egg whites from a cost-effectiveness viewpoint.

Further, once again, liquid egg whites of "100 parts of liquid egg whites" mean liquid egg whites only including raw egg whites without egg yolks admixed, and the amount of liquid egg whites is an amount in terms of raw egg whites.

<Turbidity>

Turbidity means the turbidness of water. According to the present invention, turbidity is a value measured by using a turbidimeter that employs an integrating sphere photoelectric photometry for a drinking water test method.

More specifically, the turbidity obtained by the integrating sphere photoelectric photometry is expressed by: turbidity=("diffuse transmittance"/"all-optical transmittance")*100.

Note that, according to the present invention, the turbidity is expressed by "degrees", and a polystyrene-series particulate suspension was used as a reference solution. Further, cells of 5 mm were used.

<Turbidity H1>

According to the present invention, the turbidity H1 indicates the turbidity due to complexes such as inclusion compounds of α-cyclodextrin and egg yolks ingredients resulting from the α-cyclodextrin adding process and the freezing process after that. Because frozen liquid egg whites of the present invention include the complexes, an adequate foaming property is obtained. According to the present invention, the turbidity H1 (degrees) is preferably 10 or more and more preferably 15 or more from a viewpoint of obtaining an adequate foaming property.

Specifically, according to the present invention, the turbidity H1 is calculated by subtracting the blank-test turbidity H3 (degrees), which is derived from raw-material liquid egg whites, in which no α-cyclodextrin is added, i.e., in which only egg yolks are admixed, from the turbidity H2 (degrees) of the frozen liquid egg whites of the present invention, which is measured immediately after being defrosted.

In other words, the turbidity H1 (degrees) is calculated by means of the belowmentioned formula (1).

$$H1=H2-H3 \tag{1}$$

Note that the abovementioned H2 (degrees) indicates the turbidity of the frozen liquid egg whites of the present invention measured immediately after being defrosted. Herein, "immediately after being defrosted" means within 15 minutes after it is determined that the frozen liquid egg whites are defrosted.

H3 (degrees) indicates the egg-derived turbidity y (degrees) calculated by means of the belowmentioned approximation formula (2). More specifically, the egg-derived turbidity y (degrees) indicates the turbidity of unfrozen liquid egg whites, in which egg yolks are admixed and no α-cyclodextrin is added, the admixed amount of egg yolks being the same as the admixed amount of egg yolks in the frozen liquid egg whites of the present invention.

$$y=-380.75x^2+272.42x+17.257 \tag{2}$$

where x indicates the admixed amount (parts) of egg yolks for every 100 parts of liquid egg whites.

Once again, liquid egg whites of "100 parts of liquid egg whites" mean liquid egg whites only including raw egg whites without egg yolks admixed.

Further, the admixed amount of egg yolks is derived by using a common lipid measurement method.

According to the present invention, the upper limit of the turbidity H1 is not particularly limited, but is 80 or less. This is because it is not possible to define the value H2 more than 100 since the turbidity is, as described above, turbidity= ("diffuse transmittance"/"all-optical transmittance")*100, and because the lower limit of H3 is about 20 by means of the belowmentioned approximation formula (2).

<Approximation Formula (2)>

The approximation formula (2) was derived by means of the following process. Firstly, the turbidity of liquid egg whites, in which different admixed amounts (0.01 to 0.4 parts) of egg yolks are admixed for every 100 parts of liquid egg whites was measured, and the actual measured values were plotted in a graph as shown in FIG. 1. Consequently, a second-order polynomial approximate curve was derived based on the plotted actual measured values, and the approximation formula (2) was obtained. Table 1 shows the admixed amount (parts) of egg yolks and the corresponding turbidity (degrees) value of liquid egg whites. Herein, the correlation coefficient $R^2$ is 0.9904.

TABLE 1

| Admixed amount (parts) of egg yolks | Turbidity (degrees) of liquid egg whites |
|---|---|
| 0.00 | 18.73 |
| 0.01 | 19.42 |
| 0.02 | 22.49 |
| 0.03 | 24.67 |
| 0.04 | 26.66 |
| 0.05 | 28.52 |
| 0.06 | 33.65 |
| 0.07 | 33.42 |
| 0.10 | 42.85 |
| 0.13 | 49.10 |
| 0.16 | 52.43 |
| 0.22 | 56.53 |
| 0.28 | 61.25 |
| 0.34 | 65.14 |
| 0.40 | 67.07 |

<Turbidity Change Rate>

According to the present invention, the turbidity change rate h (%) is calculated by means of the belowmentioned formula (3). The turbidity change rate h is preferably 300 or less, and the upper limit is preferably 250 or less and more preferably 200 or less. The lower limit is preferably 90 or more, and more preferably 95 or more or 100 or more.

$$h=(H4/H1)*100 \quad (3)$$

where

H4 indicates the turbidity (degrees) obtained by subtracting the egg-derived turbidity y (degrees) calculated by means of the approximation formula (2) from the turbidity (degrees) of the frozen liquid egg whites measured after being defrosted and being refrigerated (5° C.) for 5 days.

H4 indicates the increased turbidity affected by α-cyclodextrin, the freezing condition, and refrigeration after being defrosted, which is higher than the egg-derived turbidity. The "5 days" of H4 is, more specifically, 120 hours. H1 is calculated by means of the abovementioned method.

It is understood that the turbidity change rate is small because α-cyclodextrin and egg yolks in egg whites form complexes, e.g., inclusion complexes, adequately at the time when frozen liquid egg whites are defrosted and therefore increase of turbidity due to change of aspects after being defrosted has a small effect. Frozen liquid egg whites having the turbidity change rate of 300 or less have a higher foaming property because α-cyclodextrin and egg yolks ingredients form complexes adequately at the time of being defrosted.

<Ratio of Added Amount (Parts) of α-Cyclodextrin to Admixed Amount (Parts) of Egg Yolks>

In the frozen liquid egg whites of the present invention, the ratio of the added amount (parts) of α-cyclodextrin to the admixed amount (parts) of egg yolks may be 1 or more or 2 or more. In other words, the added amount of α-cyclodextrin may be larger than the admixed amount of egg yolks. As a result, α-cyclodextrin works more effectively with egg yolks, and it is possible to inhibit decrease of the foaming property due to egg yolks.

The upper limit of the ratio of the added amount (parts) of α-cyclodextrin to the admixed amount (parts) of egg yolks is not particularly limited, and is preferably 100 or less and more preferably 30 or less from a cost-effectiveness viewpoint.

<Other Additives>

The frozen liquid egg whites of the present invention may include a polysaccharide thickening agent, sucrose, lactose, pyrodextrin, salt, hydrolyzed protein, and other additives added, for example, in addition to the abovementioned ingredients, as long as effects of the present invention are attained.

<Method for Producing Frozen Liquid Egg Whites>

According to the present invention, for example, the method for producing frozen liquid egg whites includes: adding α-cyclodextrin to raw-material liquid egg whites, 0.01 parts or more and 0.4 parts or less of egg yolks being admixed for every 100 parts of liquid egg whites of the raw-material liquid egg whites, 0.1 parts or more of α-cyclodextrin being added for every 100 parts of liquid egg whites; and freezing the liquid egg whites-with-additive including α-cyclodextrin added, transit time of a product-center temperature from −1° C. to −6° C. being 3 hours or more. Hereinafter, the method will be described specifically.

<Adding Process>

Firstly, α-cyclodextrin is added to raw-material liquid egg whites, in which the abovementioned admixed amount of egg yolks are admixed, the liquid egg whites is mixed uniformly by using a common method, and liquid egg whites-with-additive are thereby obtained. Specifically, shell eggs are broken mechanically, and raw-material liquid egg whites, in which egg yolks are admixed, are thereby obtained. Consequently, α-cyclodextrin is added to the raw-material liquid egg whites, the liquid egg whites are stirred in a mixer, a magnetic stirrer, or another machine, and liquid egg whites-with-additive including α-cyclodextrin added is thereby obtained. Note that the admixed amount of egg yolks may be controlled as necessary in order to attain the abovementioned admixed amount. Stirring conditions may be determined as necessary from a viewpoint of the amount of liquid egg whites, a hygienic viewpoint, and other viewpoints. After that, the liquid egg whites-with-additive may be heat-sterilized or treated in another way. Further, the liquid egg whites-with-additive may be filled and sealed in a package made of, for example, nylon, polyethylene, a vinyl chloride, a nylon-polyethylene composite sheet, or another material.

<Freezing Process>

Consequently, the liquid egg whites-with-additive are frozen, the transit time of the product-center temperature from −1° C. to −6° C. being 3 hours or more and more preferably 5 hours or more. Specifically, the liquid egg whites-with-additive, which are filled and sealed in a package, for example, are frozen in a freezer or another machine where the abovementioned freezing condition is satisfied. Note that the product-center temperature means the measured temperature of the center part of liquid egg whites in a package. Because frozen liquid egg whites of the present invention include α-cyclodextrin added and because the abovementioned freezing condition is employed, the turbidity H1 of 10 or more is attained and the foaming property is increased.

Note that the allowable freezing temperature is the preservation temperature for general frozen foods, and is −18° C. to −40° C., for example.

Figure 2:
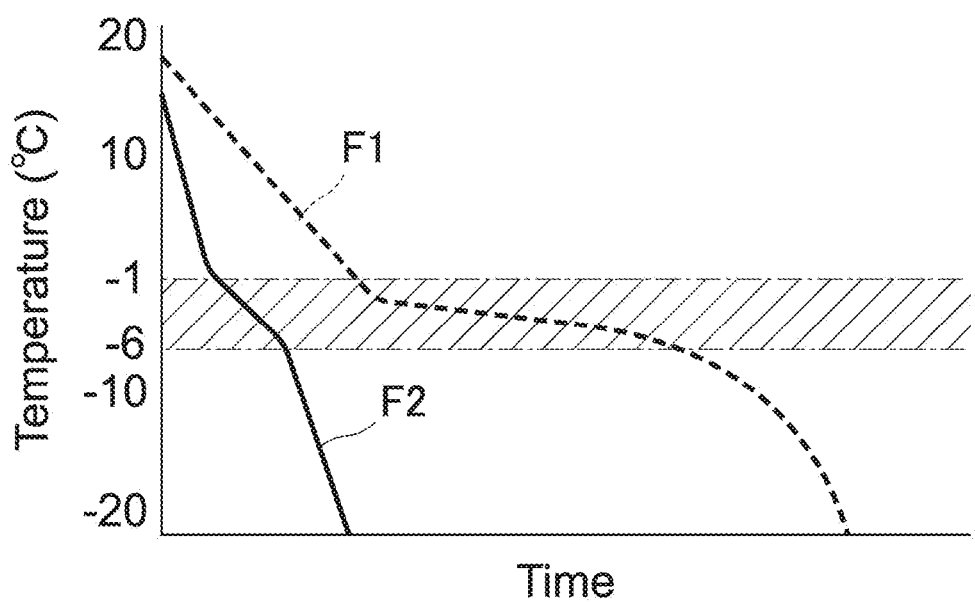
FIG. 2 A graph showing an example of decrease of the product-center temperature where the freezing condition of the present invention is employed, the horizontal axis showing time, the vertical axis showing product-center temperature. Further, F1 is a graph showing an example of decrease of the product-center temperature of an Example of the present invention, and F2 is a graph showing an example of decrease of the product-center temperature of a Comparative Example of the present invention.

FIG. 2 is a graph showing an example of decrease of the product-center temperature where the freezing condition of the present invention is employed, the horizontal axis showing time, the vertical axis showing product-center temperature. Further, F1 is a graph showing an example of decrease of the product-center temperature of the present invention, and F2 is a graph showing an example of decrease of the product-center temperature of a Comparative Example where the transit time from −1° C. to −6° C. is shorter than the transit time of the present invention. Further, in FIG. 2, the hatched temperature zone shows the temperature zone from −1° C. to −6° C., where water in egg whites starts to freeze at −1° C. and freezes almost completely at −6° C.

In the field of frozen foods, it is understood that, when freezing foods where the transit time of the temperature zone from −1° C. to −6° C. is long, large ice crystals are formed and therefore tissues of foods are highly likely to be broken. In view of this, the freezing condition of F2 of FIG. 2, in which the transit speed of this temperature zone is high, is recommended. Generally, it is believed that the freezing condition of F1 should be avoided. However, the inventors have reached frozen liquid egg whites having a non-conventionally high foaming property even if egg yolks are admixed in frozen liquid egg whites, by purposefully employing the freezing condition, which has been believed to avoid.

<Actions and Effects of Present Invention>

According to the present invention, even if frozen liquid egg whites include a possible amount of egg yolks, which may be admixed when breaking eggs industrially or due to other reasons, it is possible to attain a high foaming property after being defrosted by using α-cyclodextrin and, in addition, by employing a specific freezing condition. It is estimated that the mechanism of action is as follows.

Firstly, it is known that, similar to other cyclodextrins, α-cyclodextrin has a cavity and has an inclusion ability to form an inclusion compound with another compound. Therefore it is estimated that α-cyclodextrin forms an inclusion compound with free fatty acid, which results from denatured egg yolk lipoprotein. Further, it is presumed that α-cyclodextrin has a nature different from other cyclodextrins, i.e., α-cyclodextrin is capable of combining egg yolk lipoprotein itself, which decreases a foaming property, with the outer surface of α-cyclodextrin, for example. It is presumed that, as a result, α-cyclodextrin is capable of inhibiting a foaming property from being decreased more than other cyclodextrins.

Further, the amount of the complexes such as inclusion compounds of α-cyclodextrin and egg yolks ingredients has a correlation with the value of the turbidity H1. The turbidity value of 10 or more is extremely important to obtain a high foaming property.

Next, the value of the turbidity H1 and the foaming property, where the transit time from −1° C. to −6° C. during freezing is 3 hours or more, are higher than the value of the turbidity H1 and the foaming property, where the transit time of this temperature zone during freezing is shorter. It is presumed that this is because the number of complexes such as inclusion compounds formed is larger than that where the transit time is shorter.

Further, during freezing, even if water includes other materials such as solid materials such as solute and disperse materials, for example, only water freezes. It is therefore presumed that, during slow freezing, water firstly freezes gradually, solid content is concentrated, and thus α-cyclodextrin forms an inclusion compound with egg yolks or α-cyclodextrin combines with egg yolks with a higher probability.

Therefore, according to the present invention, it is possible to provide frozen liquid egg whites having a high preserving property and having an adequate foaming property after being defrosted.

Hereinafter, the present invention will further be described based on Examples and the like.

EXAMPLES

Examples 1 to 3

(Production of Frozen Liquid Egg Whites)

Shell eggs were broken mechanically, liquid egg whites were separated, the liquid egg whites were filtered and homogenized by using common methods, and raw-material liquid egg whites, in which egg yolks are admixed, were thus obtained. α-cyclodextrin of each added amount shown in Table 2 was added to the raw-material liquid egg whites, the raw-material liquid egg whites were stirred and mixed by using a stirring machine until being uniformly mixed, and liquid egg whites-with-additive were thus obtained. Further, the liquid egg whites-with-additive were heat-sterilized at 56° C. for 3.5 minutes by using a plate-type heat exchanger, and were packaged. Consequently, the liquid egg whites-with-additive were frozen to reach −18° C. or less, the transit time of the product-center temperature from −1° C. to −6° C. being 20 to 30 hours as shown in Table 2, and frozen liquid egg whites of Examples 1 to 3 were thus obtained. Table 2 further shows the calculation result of the ratio of the added amount of α-cyclodextrin to the admixed amount of egg yolks of each Example. As shown in Table 2, each ratio was 1 or more, specifically, 2.5 to 20.

Comparative Examples 1 to 3

Similar to the frozen liquid egg whites of Examples 1 to 3, packaged liquid egg whites-with-additive were produced. Note that Table 2 shows the egg yolks admixed amount, and α-cyclodextrin was added and/or controlled to attain the added amount shown in Table 2. Consequently, the packaged liquid egg whites were frozen to reach −18° C. or less, the transit time of the product-center temperature from −1° C. to −6° C. being 40 minutes to 50 minutes as shown in Table 2, and frozen liquid egg whites of Comparative Examples 1 to 3 were thus obtained. As shown in Table 2, each ratio of the added amount of α-cyclodextrin to the admixed amount of egg yolks was 1 or more, specifically, 2.5 to 20.

TABLE 2

|  | Example 1 | Example 2 | Example 3 | Comparative Example 1 | Comparative Example 2 | Comparative Example 3 |
|---|---|---|---|---|---|---|
| Egg yolks (parts) for every 100 parts of liquid egg whites | 0.05 | 0.01 | 0.08 | 0.05 | 0.01 | 0.08 |
| α-cyclodextrin (parts) for every 100 parts of liquid egg whites | 0.15 | 0.2 | 0.2 | 0.15 | 0.2 | 0.2 |
| Sterilized/unsterilized | Sterilized | Sterilized | Sterilized | Sterilized | Sterilized | Sterilized |
| Transit time from −1° C. to −6° C. | 20 hours | 30 hours | 25 hours | 50 minutes | 45 minutes | 45 minutes |
| Measured turbidity H2 (degrees) of frozen liquid egg whites | 48 | 56 | 60 | 30 | 27 | 45 |
| Egg-derived turbidity y (degrees) calculated by means of approximation formula (2) | 30 | 20 | 37 | 30 | 20 | 37 |
| Turbidity H1 (degrees) calculated by means of formula (1) | 18 | 36 | 23 | 0 | 7 | 8 |
| Turbidity (degrees) after being refrigerated for 5 days | 58 | 71 | 76 | 44 | 43 | 67 |
| Turbidity H4 (degrees) of formula (3) | 28 | 51 | 39 | 14 | 23 | 30 |
| Turbidity change rate h (%) | 153 | 142 | 170 | — | 328 | 369 |
| α-cyclodextrin (parts)/egg yolks (parts) | 3 | 20 | 2.5 | 3 | 20 | 2.5 |

(Measurement and Calculation of Turbidity)

Consequently, the packaged frozen liquid egg whites of Examples 1 to 3 and Comparative Examples 1 to 3 were accommodated in a constant temperature water tank of 20° C., and were defrosted until it was determined that the packaged frozen liquid egg whites were defrosted by confirming with eyes. Immediately after being defrosted, turbidity was measured by using an integrating sphere turbidimeter (manufactured by Nippon Denshoku Industries CO., Ltd., product name WA2000N), where H2 of the abovementioned formula (1) indicates the measured turbidity. The reference solution of the turbidimeter was polystyrene-series particulate suspension, and cells of 5 mm were used as cells. Consequently, y was calculated by means of the approximation formula (2), where x indicates the admixed amount (parts) of egg yolks for every 100 parts of liquid egg whites of each of Examples and Comparative Examples. H1 was calculated by means of the abovementioned formula (1), where H3 indicates y. Table 2 shows the results of H1, H2, and H3 (y).

As shown in Table 2, H1 of each of Examples 1 to 3 was 10 degrees or more, specifically, 18 to 36 degrees.

To the contrary, H1 of each of Comparative Examples 1 to 3 was less than 10 degrees, specifically, 0 to 8 degrees.

(Calculation of Turbidity Change Rate)

Consequently, the frozen liquid egg whites of each of Examples and Comparative Examples were defrosted, and were refrigerated in a refrigerator at 5° C. for 5 days (120 hours). After that, the turbidity was measured by using the abovementioned turbidimeter and cells, where H4 of the formula (3) indicates the measured turbidity. Further, the measured H4 and the calculated H1 were substituted in the formula (3) to thereby calculate h. Table 2 shows the calculation results.

As shown in Table 2, the turbidity change rate h of each of Examples 1 to 3 was 300% or less, specifically, 142 to 170%.

To the contrary, the turbidity change rate h of Comparative Example 1 could not be calculated because the turbidity H1 was 0 degrees. Further, the turbidity change rate h of Comparative Example 2 was 328% and that of Comparative Example 3 was 369%, both of which were larger than 300%.

Example 4

Frozen liquid egg whites were produced similar to the frozen liquid egg whites of Example 1 except that the added amount of α-cyclodextrin was 0.5 parts. Consequently, similar to the frozen liquid egg whites of Examples 1 to 3, the turbidity was measured and calculated, and the turbidity change rate was calculated. The turbidity H2 was 85 degrees, the turbidity H3 (y) was 30 degrees, and the turbidity H1 was therefore 55 degrees according to the formula (1). Further, the turbidity measured after being refrigerated for 5 days was 84 degrees, the turbidity H4 was 54 degrees, and turbidity change rate h was therefore 97% according to the formula (3). Further, the ratio of the added amount of α-cyclodextrin to the admixed amount of egg yolks was 10.

Example 5

Frozen liquid egg whites were produced similar to the frozen liquid egg whites of Example 1 except that the added amount of α-cyclodextrin was 1 part and that transit time of a product-center temperature from −1° C. to −6° C. was 15 hours. Consequently, similar to the frozen liquid egg whites of Examples 1 to 3, the turbidity was measured and calculated, and the turbidity change rate was calculated. The turbidity H2 was 89 degrees, the turbidity H3 (y) was 30 degrees, and the turbidity H1 was therefore 59 degrees according to the formula (1). Further, the turbidity measured after being refrigerated for 5 days was 88 degrees, the turbidity H4 was 58 degrees, and turbidity change rate h was therefore 99% according to the formula (3). Further, the ratio of the added amount of α-cyclodextrin to the admixed amount of egg yolks was 20.

Example 6

Frozen liquid egg whites were produced similar to the frozen liquid egg whites of Example 1 except that the admixed amount of egg yolks was 0.1 parts, that the added amount of α-cyclodextrin was 2 parts, and that transit time of a product-center temperature from −1° C. to −6° C. was 5 hours. Consequently, similar to the frozen liquid egg whites of Examples 1 to 3, the turbidity was measured and calculated, and the turbidity change rate was calculated. The turbidity H2 was 88 degrees, the turbidity H3 (y) was 41 degrees, and the turbidity H1 was therefore 47 degrees according to the formula (1). Further, the turbidity measured after being refrigerated for 5 days was 89 degrees, the turbidity H4 was 48 degrees, and turbidity change rate h was therefore 102% according to the formula (3). Further, the ratio of the added amount of α-cyclodextrin to the admixed amount of egg yolks was 20.

Example 7

Frozen liquid egg whites were produced similar to the frozen liquid egg whites of Example 3 except that heat-sterilization was not performed. Consequently, similar to the frozen liquid egg whites of Examples 1 to 3, the turbidity was measured and calculated, and the turbidity change rate was calculated. The turbidity H2 was 86 degrees, the turbidity H3 (y) was 37 degrees, and the turbidity H1 was therefore 49 degrees according to the formula (1). Further, the turbidity measured after being refrigerated for 5 days was 82 degrees, the turbidity H4 was 45 degrees, and turbidity change rate h was therefore 91% according to the formula (3). Further, the ratio of the added amount of α-cyclodextrin to the admixed amount of egg yolks was 2.5.

Example 8

Frozen liquid egg whites were produced similar to the frozen liquid egg whites of Example 1 except that the admixed amount of egg yolks was 0.07 parts, that the added amount of α-cyclodextrin was 1.2 parts, and that transit time of a product-center temperature from −1° C. to −6° C. was 3 hours. Consequently, similar to the frozen liquid egg whites of Examples 1 to 3, the turbidity was measured and calculated, and the turbidity change rate was calculated. The turbidity H2 was 89 degrees, the turbidity H3 (y) was 34 degrees, and the turbidity H1 was therefore 55 degrees according to the formula (1). Further, the turbidity measured after being refrigerated for 5 days was 89 degrees, the turbidity H4 was 55 degrees, and turbidity change rate h was therefore 100% according to the formula (3). Further, the ratio of the added amount of α-cyclodextrin to the admixed amount of egg yolks was 17.

Comparative Example 4

Frozen liquid egg whites were produced similar to the frozen liquid egg whites of Comparative Example 1 except that β-cyclodextrin instead of α-cyclodextrin was added, the added amount being 0.15 parts for every 100 parts of liquid egg whites, and that transit time of a product-center temperature from −1° C. to −6° C. was 40 minutes. Consequently, similar to the frozen liquid egg whites of Examples 1 to 3, the turbidity was measured and calculated, and the turbidity change rate was calculated. The turbidity H2 was 50 degrees, the turbidity H3 (y) was 30 degrees, and the turbidity H1 was 20 degrees according to the formula (1).

Comparative Example 5

Frozen liquid egg whites were produced similar to the frozen liquid egg whites of Example 1 except that no α-cyclodextrin was added. Consequently, similar to the frozen liquid egg whites of Examples 1 to 3, the turbidity was measured and calculated. The turbidity H2 was 30 degrees, the turbidity H3 (y) was 30 degrees, and the turbidity H1 was 0 degrees according to the formula (1).

Comparative Example 6

Frozen liquid egg whites were produced similar to the frozen liquid egg whites of Comparative Example 1 except that no α-cyclodextrin was added. Consequently, similar to the frozen liquid egg whites of Examples 1 to 3, the turbidity was measured and calculated. The turbidity H2 was 30 degrees, the turbidity H3 (y) was 30 degrees, and the turbidity H1 was 0 degrees according to the formula (1).

Experimental Examples: Evaluation of Foaming Property (Stiffness)

The foaming property of the obtained frozen liquid egg whites of each of Examples 1 to 8 and Comparative Examples 1 to 6 after being defrosted was evaluated. Herein, stiffness of foam was evaluated as follows, the stiffness of foam being important to obtain a higher leavening degree and better texture of confectionaries and breads. Note that, as Reference Example, shell eggs are broken, and unfrozen and unsterilized liquid egg whites without egg yolks admixed were prepared and were evaluated in the same way.

500 g of defrosted frozen liquid egg whites and 500 g of sugar were put in a 12 quart mixer (manufactured by Hobart) and stirred for 7.5 minutes at the third speed (358 rpm), and the total amount thereof were thus foamed. Consequently, measurement was executed by using a weight sink method (JS measurement method). Specifically, disk-shape weights each having a diameter of 4 cm and a predetermined weight were placed on the surface of the foam, and the weight of the weight that did not sink for 15 minutes in this situation was examined. The larger the value, the more stiff and the firmer the foam. Table 3 to Table 5 show the results. Note that Table 3 shows the results of Examples 1, 4, 5, 6, and 8 and Comparative Examples 1 and 4 to 6. Table 4 shows the results of Example 2 and Comparative Example 2, in which the admixed amount of egg yolks and the added amount of α-cyclodextrin are the same. Table 5 shows the results of Example 3, Example 7, and Comparative Example 3 in which the admixed amount of egg yolks and the added amount of α-cyclodextrin are the same. Further, the stiffness value was measured in [g].

TABLE 3

| | Egg yolks (parts)/ α(β)-cyclodextrin (parts) | Stiffness (g) |
|---|---|---|
| Reference Example | — | 200 |
| Example 1 | 0.05/0.15 | 160 |
| Comparative Example 1 | 0.05/0.15 | 150 |
| Comparative Example 4 | 0.05/β 0.15 | 140 |
| Comparative Example 5 | 0.05/0 | 120 |
| Comparative Example 6 | 0.05/0 | 130 |
| Example 4 | 0.05/0.5 | 200 |
| Example 5 | 0.05/1 | 200 |
| Example 6 | 0.1/2 | 190 |
| Example 8 | 0.07/1.2 | 180 |

TABLE 4

| | Egg yolks (parts)/ α-cyclodextrin (parts) | Stiffness (g) |
|---|---|---|
| Reference Example | — | 200 |
| Example 2 | 0.01/0.2 | 180 |
| Comparative Example 2 | 0.01/0.2 | 170 |

TABLE 5

| | Egg yolks (parts)/ α-cyclodextrin (parts) | Stiffness (g) |
|---|---|---|
| Reference Example | — | 200 |
| Example 3 | 0.08/0.2 | 150 |
| Example 7 | 0.08/0.2 | 180 |
| Comparative Example 3 | 0.08/0.2 | 120 |

Firstly, with reference to Table 3, it was confirmed that the stiffness obtained in Example 1 was closer to the stiffness of Reference Example than the stiffness obtained in Comparative Example 1 was, the amounts of egg yolks and α-dextrin included in Example 1 and Comparative Example 1 being the same. Further, with reference to Table 4, it was confirmed that the stiffness obtained in Example 2 was also closer to the stiffness of Reference Example than the stiffness obtained in Comparative Example 2 was, the amounts of egg yolks and α-dextrin included in Example 2 and Comparative Example 2 being the same. Further, with reference to Table 5, it was confirmed that the stiffness obtained in Example 3 was also closer to the stiffness of Reference Example than the stiffness obtained in Comparative Example 3 was, the amounts of egg yolks and α-dextrin included in Example 3 and Comparative Example 3 being the same. Therefore, it was confirmed that the foaming property of frozen liquid egg whites of the present invention was closer to the ideal foaming property of Reference Example than the foaming property of rapid-frozen frozen liquid egg whites was, the frozen liquid egg whites of the present invention being obtained under the freezing condition of the present invention and having the turbidity H1 of 10 or more, the rapid-frozen frozen liquid egg whites having the turbidity H1 of 10 or less.

Consequently, with reference to Table 3 again, the result of Example 1 is compared with the results of Comparative Examples 1 and 4 to 6. It was confirmed that the stiffness obtained in Example 1 was closer to the stiffness of Reference Example than the stiffness obtained in each of Comparative Examples 1 and 4 to 6 was, α-cyclodextrin being added in Example 1, no α-cyclodextrin being added in Comparative Examples 1 and 4 to 6.

Further, it was confirmed that foam obtained in Example 1 was stiffer than foam obtained in Comparative Example 5, the freezing condition of Example 1 and Comparative Example 5 being similar. Therefore, it was confirmed that it was necessary to add α-cyclodextrin to obtain stiff foam, in addition to freezing under the freezing condition of the present invention.

Further, Comparative Example 5 was compared with Comparative Example 6, egg yolks being admixed and no α-cyclodextrin being added in Comparative Examples 5 and 6. Foam obtained in Comparative Example 6 was stiffer than form obtained in Comparative Example 5, Comparative Example 6 employing rapid freezing, Comparative Example 5 employing the freezing condition of the present invention. In other words, this result held true for the technical common knowledge of the industrial field of frozen foods. To the contrary, however, when egg yolks were admixed and α-cyclodextrin was added, foam obtained in Example 1 was stiffer than foam obtained in Comparative Example 1, Example 1 employing the freezing condition of the present invention which was considered to be avoided in the past, Comparative Example 1 employing rapid freezing. Therefore, it was confirmed that, by adding α-cyclodextrin and by employing the freezing condition of the present invention, the obtained result reversed the technical common knowledge in the past.

Further, with reference to Table 3, it was also confirmed that foam obtained in Example 1 was stiffer than foam obtained in Comparative Example 4, Comparative Example 4 being known as a conventional example in which β-cyclodextrin was added and rapid freezing was employed.

Further, it was confirmed that the foaming property of each of Examples 4 and 5 was higher than the foaming property of Example 1, the amounts of egg yolks admixed being the same, Examples 4 and 5 including more α-cyclodextrin added than Example 1. Further, it was confirmed that the foaming property obtained in Example 6 was high where the ratio of the added amount of α-cyclodextrin to the admixed amount of egg yolks was high, even if the amount of egg yolks included in Example 6 was larger than the amount of egg yolks included in Example 4. Therefore, once again, it was confirmed that α-cyclodextrin contributed to increase in the foaming property. In addition, it was confirmed that the higher the ratio of the added amount of α-cyclodextrin to the admixed amount of egg yolks, the higher the foaming property tends to be.

In addition, it was confirmed that an adequate foaming property was obtained in Example 8, although Example 8 employed the freezing time of 3 hours, which is shorter than those of the other Examples.

Further, with reference to Table 5, it was confirmed that the foaming property of Example 7, unsterilized, was higher than the foaming property of Example 3, the amounts of egg yolks and α-cyclodextrin added being the same. Note that, as a matter of course, it was also confirmed that the foaming property of Example 7 was higher than the foaming property of Comparative Example 3, rapidly frozen, the amounts of egg yolks and α-cyclodextrin added being the same. Therefore, it was confirmed that the present technology was applicable to unsterilized frozen liquid egg whites.

Example 9

In Example 9, frozen liquid egg whites were produced similar to the frozen liquid egg whites of Example 1 except that 0.01 parts of xanthane gum, i.e., a polysaccharide thickening agent, was added for every 100 parts of liquid egg whites.

The turbidity H1 of the obtained frozen liquid egg whites was 18 degrees or more and 80 degrees or less, and the turbidity change rate h was 90% or more and 170% or less.

Further, the foaming property (stiffness) was evaluated similar to the experimental examples. It was confirmed that the foaming property was adequate similar to Example 1.

[Consideration]

Consideration of the present invention will be made based on the results of the experimental examples. When producing frozen liquid egg whites under the freezing condition of the present invention, firstly, ice crystals are formed slowly, and the density of α-cyclodextrin and the density egg yolks are gradually increased in water. It is presumed that, in this process, α-cyclodextrin forms an inclusion compound with free fatty acid in a cavity, which results from denatured egg yolk lipoprotein, and that α-cyclodextrin combines egg yolk lipoprotein itself with the outer surface of α-cyclodextrin. It is presumed that, as a result, α-cyclodextrin inhibits decrease of the foaming property due to egg yolks, supposedly.

Further, it is presumed that the turbidity is increased because complexes such as inclusion compounds and/or binding compounds of α-cyclodextrin and egg yolk are formed.

To the contrary, it is presumed that, in rapid freezing, it is difficult for α-cyclodextrin and lipoprotein of egg yolks to interact with each other and decrease of a foaming property due to egg yolks is not inhibited, because ice crystals are formed rapidly.

Further, although β-cyclodextrin had an inclusion ability similar to α-cyclodextrin, an adequate foaming property was not obtained even controlling the freezing speed. It suggests that, although β-cyclodextrin forms an inclusion compound with free fatty acid, which results from denatured egg yolk lipoprotein, decrease of a foaming property is not inhibited adequately because β-cyclodextrin fails to combine egg yolk lipoprotein itself, supposedly. Therefore, it is presumed that the foaming property is increased when α-cyclodextrin is especially used instead of the other cyclodextrins, egg whites are frozen under the freezing condition of the present invention, and complexes of α-cyclodextrin and egg yolk lipoprotein are thereby formed.

The invention claimed is:

1. A method for producing frozen liquid egg whites, comprising: adding α-cyclodextrin to raw-material liquid egg whites in an amount of from 0.1 mass parts to 2.0 mass parts of α-cyclodextrin for every 100 parts of raw-material liquid egg whites; admixing from 0.01 mass parts to 0.40 mass parts of egg yolks for every 100 mass parts of raw-material liquid egg whites; and freezing the liquid egg whites comprising α-cyclodextrin and admixed egg yolks, wherein a transit time for a product-center temperature to go from −1° C. to −6° C. is 3 hours or more.

2. A method for producing frozen liquid egg whites, comprising: adding α-cyclodextrin to raw-material liquid egg whites in an amount of from 0.1 mass parts to 2.0 mass parts of α-cyclodextrin for every 100 parts of raw-material liquid egg whites; admixing from 0.01 mass parts to 0.40 mass parts of egg yolks for every 100 mass parts of raw-material liquid egg whites; and freezing the liquid egg whites comprising α-cyclodextrin and admixed egg yolks, wherein a transit time for a product-center temperature to go from −1° C. to −6° C. is from 3 hours to 5 hours.

* * * * *